Figure 1:
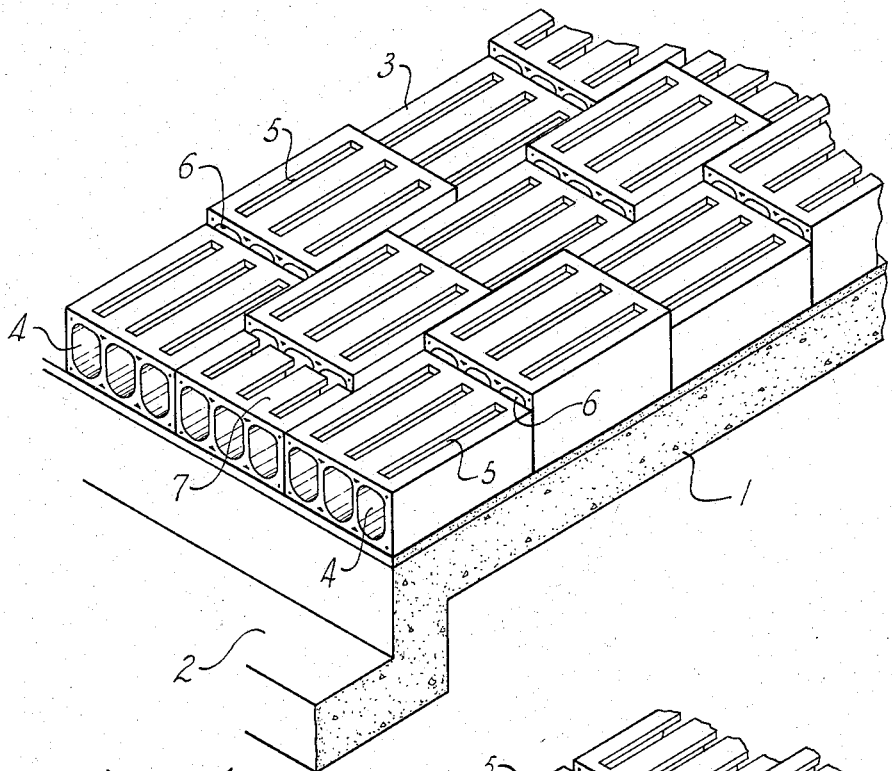

INVENTOR.
Edwin F. Wanner
BY William B. Jaspert
Attorney.

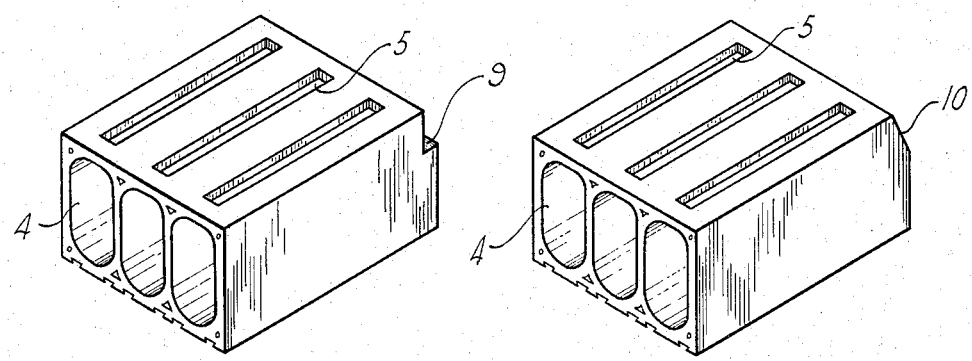
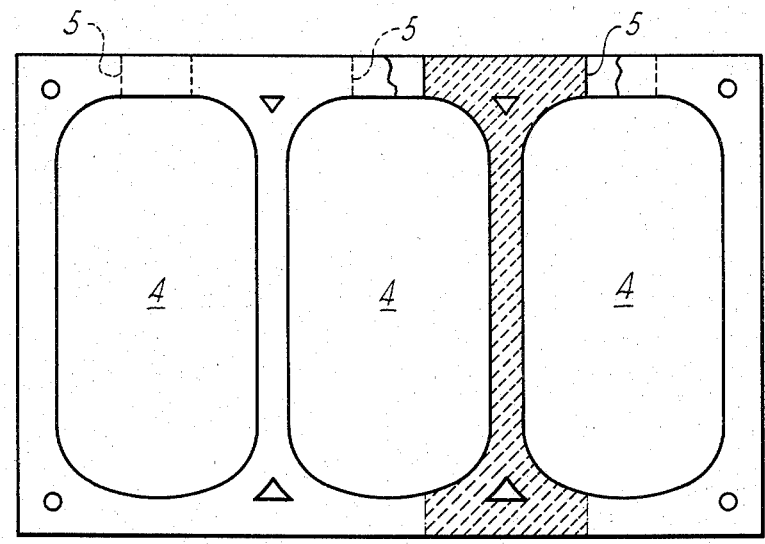
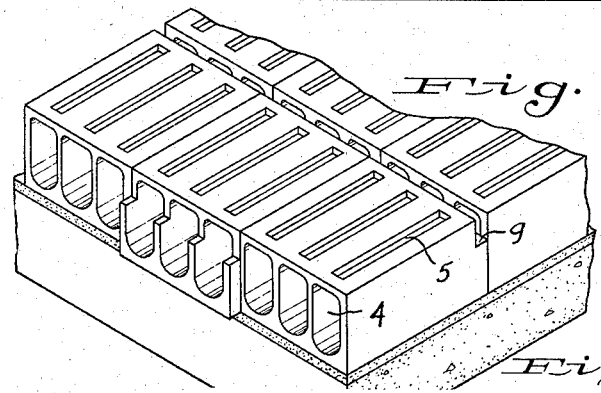

United States Patent Office

2,874,844
Patented Feb. 24, 1959

2,874,844

FILTER BEDS AND TILE

Edwin F. Wanner, Pittsburgh, Pa.

Application April 7, 1955, Serial No. 499,950

2 Claims. (Cl. 210—150)

This invention relates to new and useful improvements in filter tile and filter beds, more particularly of the trickling filter type used in large beds, and it is among the objects thereof to provide filter tile of a structural shape embodying I-sections which make the tile reversible for use without impairing its strength.

A further object of the invention is to provide tile structures for filter beds which may be arranged to supplement aeration to the flow channels in addition to that normally supplied by slotted openings or perforations conventionally used in the top of such filter tile.

Figure 2:
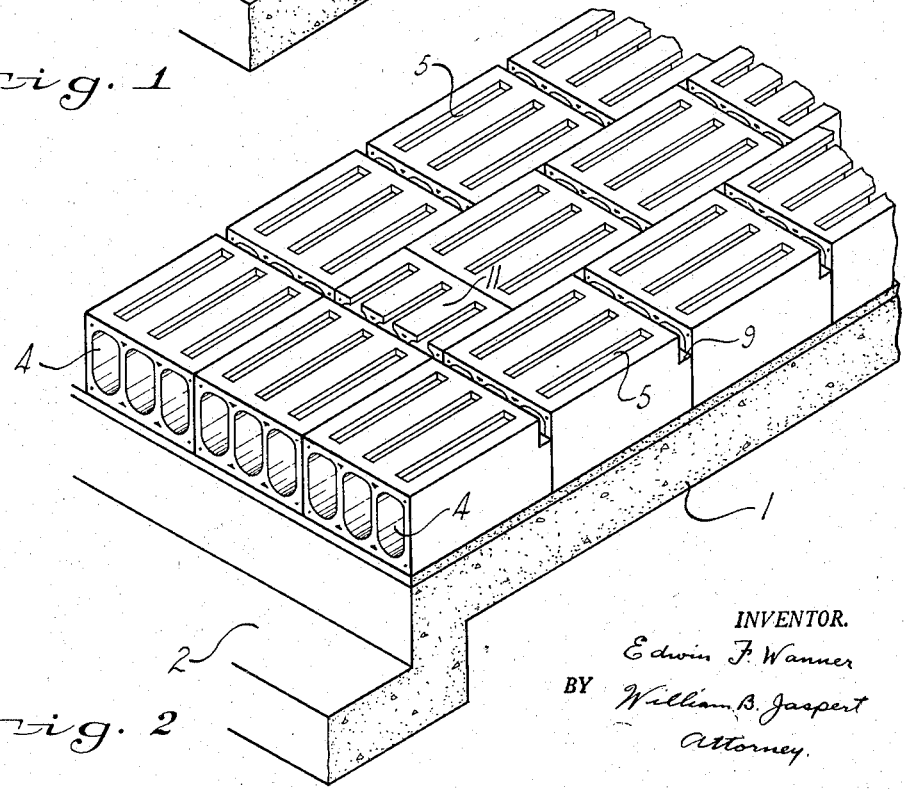

These and other objects of the invention will become more apparent from a consideration of the accompanying drawings constituting a part hereof in which like reference characters designate like parts and in which:

Figure 1 is an isometric view of a portion of a trickling filter bed embodying the principles of this invention;

Figure 2, a similar view with a modified form of filter block for use in such beds;

Figure 3, an isometric view of a single filter block employed in the filter bed of Figure 2;

Figure 4, a similar view of a modified form of the block of Figure 3;

Figure 5, an end elevational view, partially in section, of a filter block; and

Figure 6, an isometric view of a portion of a trickling filter bed in which alternate rows of tile are assembled with their shoulders oppositely disposed to provide against lateral displacement transversely of the rows.

With reference to Figure 1 of the drawings, the numeral 1 designates generally a concrete foundation for a trickling filter bed having a flow trough 2, half of which is shown. Mounted on the foundation 1 are rows of filter tile generally designated by the numeral 3 of the shape as shown in Figure 5 of the drawing, the tile being provided with cells 4 that are flow channels, and with aerating slots 5, the flow channels being divided by partitions of I-shape to lend strength for supporting the coarse aggregate or filtering material that is placed thereon. One of the features of the invention is the use of the I-shape web whereby the block may be reversed without impairing its strength, this being commonly done in bridging the flow troughs 2 and other aeration troughs.

In accordance with the primary object of the invention, the normal aeration of the slotted or perforated filter block is increased substantially by exposing a portion of the flow channels 4 of the filter tile at the ends or joints of the tile. This is accomplished by employing tile of different height alternately in each row of tile and staggered in adjacent rows of the tile, as shown in Figure 1 of the drawings. For example, the first row adjacent the flow channel 2 may be a tile six inches in height and the adjacent tile is 7½ inches in height, leaving a substantial air space marked 6 in the drawing, to supplement the aerating effect of the slots 5 of the tile. As shown in Figure 1, a half tile designated by the numeral 7 may be employed at the end of a row to obtain the aerating effect, so that each and every 7½ inch tile, or the higher of the tile in the rows of tile, extends above the upper face of the tile of lesser height.

In Figure 2 is shown the use of trickling filter tile all of a uniform height such as 7½ inches, which are arranged in rows and staggered in alternate rows and in which the supplemental aeration is accomplished by notching the tile at one end, as shown at 9, and which is more clearly shown in Figure 3 of the drawing. Such a notch, which may be 2½ inches deep or more, provides substantial additional exposed area of the flow passages 4 to supplement the air supplied through the slots 5. Another way of accomplishing this end is by chamfering or beveling the one edge of the tile, as shown at 10 in Figure 4, so that when the tile are arranged in rows, as shown in Figure 2, a substantial portion of the upper part of the flow passages 4 is exposed.

As shown in Figure 2, a half tile 11 may be employed in a row of tile to allow for the use of full tile at the flow channel edge, or any edge of the filter bed.

As shown in Figure 6, alternate rows of the filter bed tile have their shoulders 9 disposed in opposite directions, leaving the same spacing between the ends of the tile as in the form shown in Figure 2, with the advantage, however, that the tile need not be staggered, as in Figure 2, because the shoulders of adjacent tile interact, or abut, to prevent lateral displacement of the rows. This strengthens the bed in a transverse direction.

It is evident from the foregoing description of this invention that trickling filter beds constructed of I-shape section tile are durable and makes the tile reversible, if desired. Also, by employing tile of different height and by alternating the tile in the rows of tile of the filter bed and staggering the tile in adjacent rows for structural strength, a filter bed of substantially greater aerating value may be produced. The same thing may be accomplished by notching or cutting the tile at the abutting faces of the tile in a row to expose the flow channels or cells so that the aerating slots of the tile need not be enlarged to the point of weakening the tile structure where aeration is important, as in trickling filter beds.

Although one embodiment of the invention has been herein illustrated and described, it will be evident to those skilled in the art that various modifications may be made in the details of construction without departing from the principles herein set forth.

I claim:

1. A trickling filter bed comprising rows of filter tile each tile having cells forming flow passages and having a wall of the tile perforated to form a grid structure to support a filtering bed thereon, each row of tile having alternating tile of varying height to expose a portion of the flow channels of the tile of greatest height at the joint of the tile to supplement the aerating effect of the perforated wall of the tile.

2. A trickling filter bed comprising rows of filter tile, each tile having cells forming flow passages and having a wall of the tile perforated to form a grid structure to support a filtering bed thereon, some of said tile being of greater height than others to expose a portion of the flow channels of the tile of greatest height to supplement the aerating effect of the perforated wall of the tile.

References Cited in the file of this patent

UNITED STATES PATENTS

| | | |
|---|---|---|
| 1,414,444 | Straight | May 2, 1922 |
| 1,601,465 | Barbour | Sept. 28, 1926 |
| 1,773,417 | Whitacre | Aug. 19, 1930 |
| 2,378,239 | Myron | June 12, 1945 |

FOREIGN PATENTS

| | | |
|---|---|---|
| 8,590 of 1908 | Great Britain | Apr. 18, 1908 |